(12) United States Patent
Gao et al.

(10) Patent No.: US 11,606,556 B2
(45) Date of Patent: Mar. 14, 2023

(54) FAST PATCH GENERATION FOR VIDEO BASED POINT CLOUD CODING

(71) Applicant: TENCENT AMERICA LLC, Palo Alto, CA (US)

(72) Inventors: Wen Gao, West Windsor, NJ (US); Xiang Zhang, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 13 days.

(21) Appl. No.: 17/502,605

(22) Filed: Oct. 15, 2021

(65) Prior Publication Data

US 2023/0040484 A1    Feb. 9, 2023

Related U.S. Application Data

(60) Provisional application No. 63/223,793, filed on Jul. 20, 2021.

(51) Int. Cl.
*H04N 19/119* (2014.01)
*H04N 19/46* (2014.01)
*H04N 19/117* (2014.01)
*H04N 19/80* (2014.01)

(52) U.S. Cl.
CPC ........ *H04N 19/119* (2014.11); *H04N 19/117* (2014.11); *H04N 19/46* (2014.11); *H04N 19/80* (2014.11)

(58) Field of Classification Search
None
See application file for complete search history.

(56) References Cited

U.S. PATENT DOCUMENTS

| 2019/0311502 | A1* | 10/2019 | Mammou | G06T 17/00 |
| 2020/0020132 | A1* | 1/2020 | Sinharoy | H03M 7/3059 |
| 2021/0183109 | A1* | 6/2021 | Chevet | H04N 19/597 |

OTHER PUBLICATIONS

International Search Report dated Jan. 25, 2022 in Application No. PCT/US 21/55380.
Written Opinion of the International Searching Authority dated Jan. 25, 2022 in Application No. PCT/US 21/55380.
"V-PCC Codec Description", ISO/IEC JTC 1/SC 29/WG 7 No. 0012, Dec. 1, 2020, 73 pgs.

(Continued)

*Primary Examiner* — Stuart D Bennett
(74) *Attorney, Agent, or Firm* — Sughrue Mion, PLLC

(57) ABSTRACT

Methods and apparatuses of encoding a video stream using video point cloud coding include determining a projection plane for each point in the point cloud; creating a list of raw points included in the point cloud; generating a list of connected components; determining whether a number of connected components is greater than a first threshold; based on determining that the number of the connected components is greater than the first threshold, processing the connected components and generating one or more patches based on the processed connected components; and generating an encoded video stream based on the generated one or more patches, wherein the list of raw points is updated based on at least one from among a result of the generating of the list of connected components, and a result of the processing of the connected components.

20 Claims, 10 Drawing Sheets

(56) References Cited

OTHER PUBLICATIONS

Rufael Mekuria et al., "Requirements for Point Cloud Compression", ISO/IEC JTC1/SC29/WG11 MPEG2016/n16330, Feb. 2016, 3 pgs., Geneva, CH.
Christian Tulvan et al., "Use Cases for Point Cloud Compression (PCC)", ISO/IEC JTC1/SC29/WG11 MPEG2015/N16331, Jun. 2016, 8 pgs., Geneva, CH.

* cited by examiner

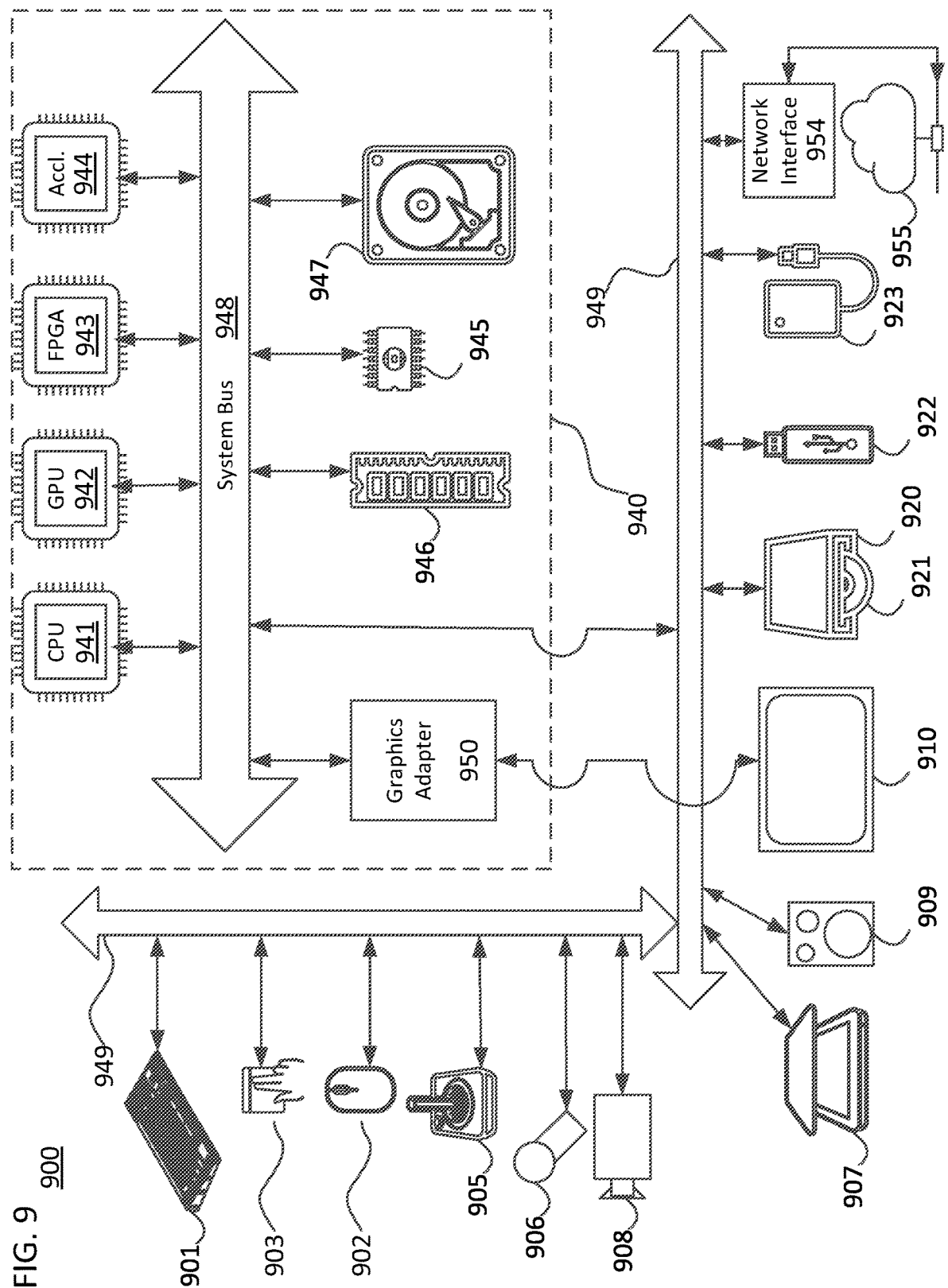

FAST PATCH GENERATION FOR VIDEO BASED POINT CLOUD CODING

CROSS-REFERENCE TO RELATED APPLICATION

This application claims priority from U.S. Provisional Application No. 63/223,793, filed on Jul. 20, 2021, the disclosure of which is incorporated herein by reference in its entirety.

FIELD

This disclosure is directed to a set of advanced video coding technologies, more specifically, video based point cloud compression including fast patch generation.

BACKGROUND

Advanced three-dimensional (3D) representations of the world are enabling more immersive forms of interaction and communication. They also allow machines to understand, interpret, and navigate our world. Point clouds have been widely used as a 3D representation of the world. For example, they may be used in autonomous driving vehicles for object detection and localization; in geographic information systems (GIS) for mapping, and in cultural heritage to visualize and archive cultural heritage objects and collections, etc. Several use cases associated with point cloud data have been identified, and some corresponding requirements for point cloud representation and compression have been developed.

Point clouds contain a set of high dimensional points, for example three dimensional (3D), each including 3D position information and additional attributes such as color, reflectance, etc. They can be captured using multiple cameras and depth sensors, or Lidar in various setups, and may be made up of thousands up to billions of points to realistically represent the original scenes.

Compression technologies are needed to reduce the amount of data required to represent a point cloud for faster transmission or reduction of storage. ISO/IEC MPEG (JTC 1/SC 29/WG 11) has created an ad-hoc group (MPEG-PCC) to standardize the compression techniques for static or dynamic cloud.

SUMMARY

According to embodiments, a method of encoding a video stream using video point cloud coding, is performed by at least one processor and includes obtaining a point cloud; determining a projection plane for each point in the point cloud; creating a list of raw points included in the point cloud; generating a list of connected components for the list of raw points; determining whether a number of connected components in the list of connected components is greater than a first threshold; based on determining that the number of the connected components in the list of connected components is greater than the first threshold, processing the connected components in the list of connected components and generating one or more patches based on the processed connected components; and generating an encoded video stream based on the generated one or more patches, wherein the list of raw points is updated based on at least one from among a result of the generating of the list of connected components, and a result of the processing of the connected components.

According to embodiments, an apparatus for encoding a video stream using video point cloud coding includes at least one memory configured to store program code; and at least one processor configured to read the program code and operate as instructed by the program code, the program code including: first obtaining code configured to cause the at least one processor to obtain a point cloud; first determining code configured to cause the at least one processor to determine a projection plane for each point in the point cloud; creating code configured to cause the at least one processor to create a list of raw points included in the point cloud; first generating code configured to cause the at least one processor to generate a list of connected components for the list of raw points; second determining code configured to cause the at least one processor to determine whether a number of connected components in the list of connected components is greater than a first threshold; processing code configured to cause the at least one processor to, based on determining that the number of the connected components in the list of connected components is greater than the first threshold, processing the connected components in the list of connected components and generating one or more patches based on the processed connected components; and second generating code configured to cause the at least one processor to generate an encoded video stream based on the generated one or more patches, wherein the list of raw points is updated based on at least one from among a result of the generating of the list of connected components, and a result of the processing of the connected components.

According to embodiments, a non-transitory computer-readable medium stores computer instructions for encoding a video stream using video point cloud coding that, when executed by at least one processor, cause the at least one processor to: obtain a point cloud; determine a projection plane for each point in the point cloud; create a list of raw points included in the point cloud; generate a list of connected components for the list of raw points; determine whether a number of connected components in the list of connected components is greater than a first threshold; based on determining that the number of the connected components in the list of connected components is greater than the first threshold, process the connected components in the list of connected components and generate one or more patches based on the processed connected components; and generate an encoded video stream based on the generated one or more patches, wherein the list of raw points is updated based on at least one from among a result of the generating of the list of connected components, and a result of the processing of the connected components.

BRIEF DESCRIPTION OF THE DRAWINGS

Further features, the nature, and various advantages of the disclosed subject matter will be more apparent from the following detailed description and the accompanying drawings in which:

FIG. 9 is a diagram of a computer system suitable for implementing embodiments.

DETAILED DESCRIPTION

A consideration behind video-based point cloud compression (V-PCC) is to leverage existing video codecs to compress the geometry, occupancy, and texture of a dynamic point cloud as three separate video sequences. The extra metadata needed to interpret the three video sequences may be compressed separately. A small portion of the overall bitstream is the metadata, which could be encoded/decoded efficiently using software implementation. The bulk of the information may be handled by the video codec.

With reference to FIGS. 1-4, an embodiment of the present disclosure for implementing encoding and decoding structures of the present disclosure are described. The encoding and decoding structures of the present disclosure may implement aspects of V-PCC described above.

Figure 1:
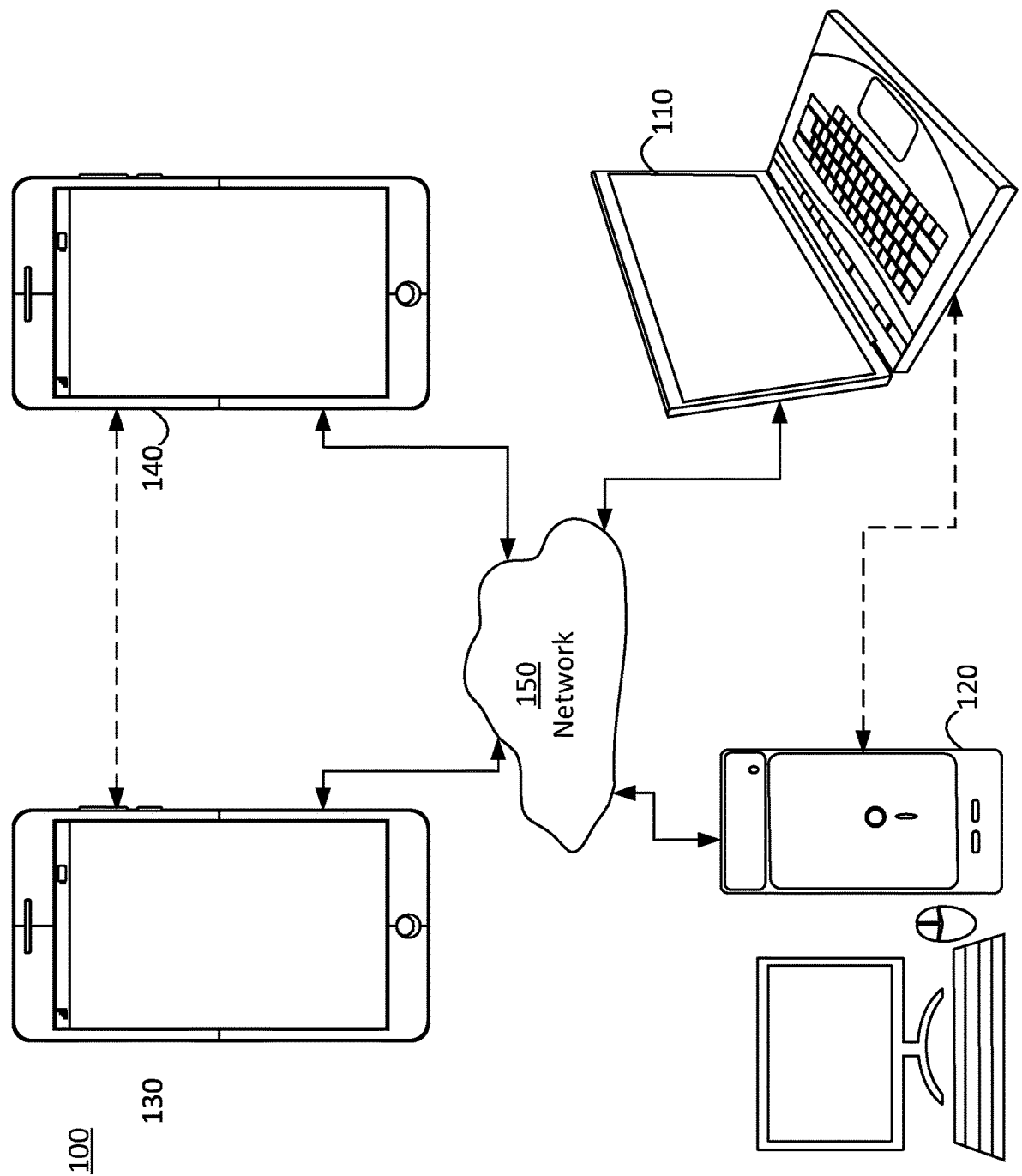
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include 3D point cloud data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
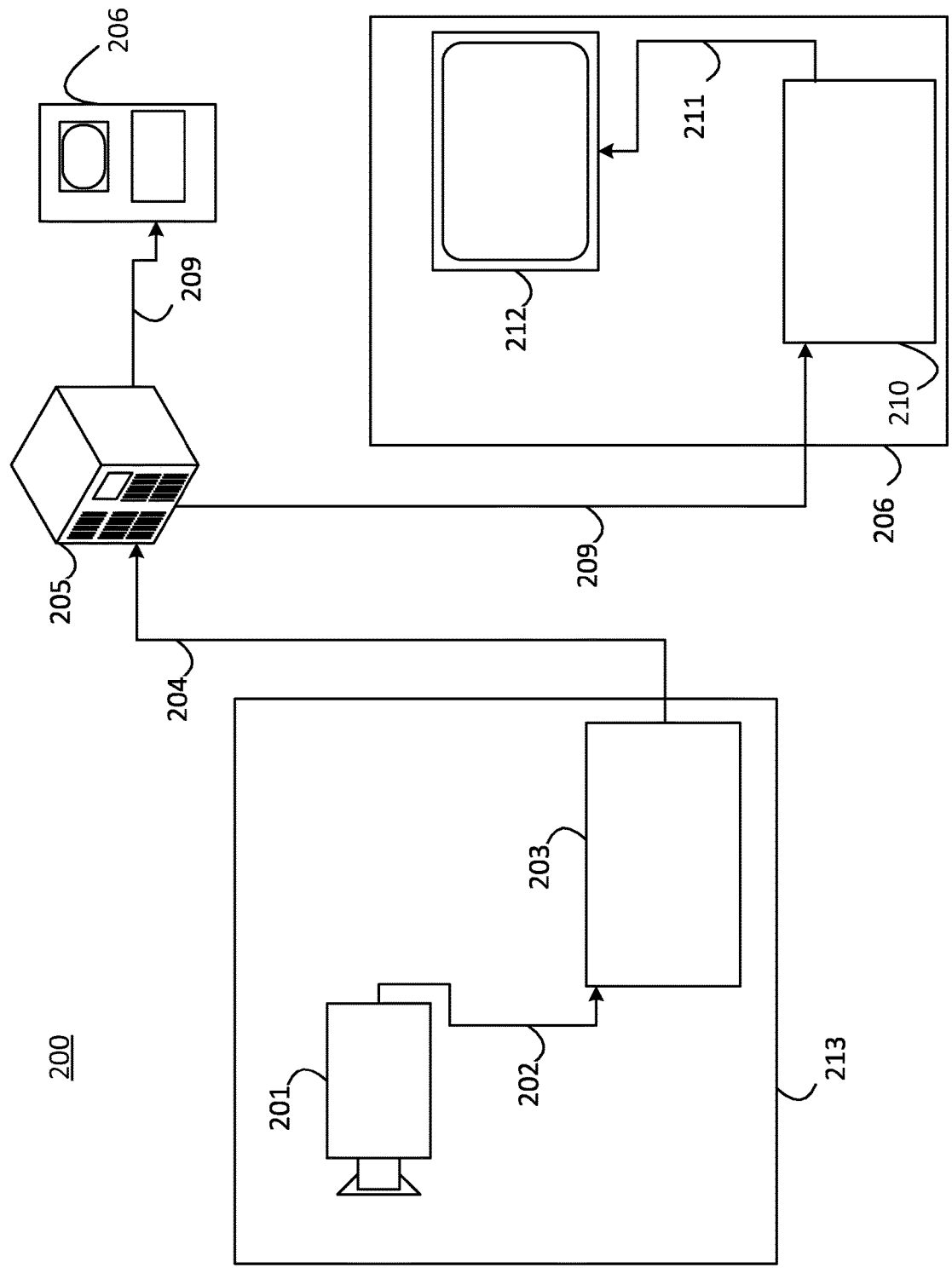
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D point cloud corresponding to a 3D video. The video source 201 may include, for example, 3D sensors (e.g. depth sensors) or 3D imaging technology (e.g. digital camera(s)), and a computing device that is configured to generate the 3D point cloud using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265, Versatile Video Coding (VVC), and MPEG/V-PCC.

Figure 3:
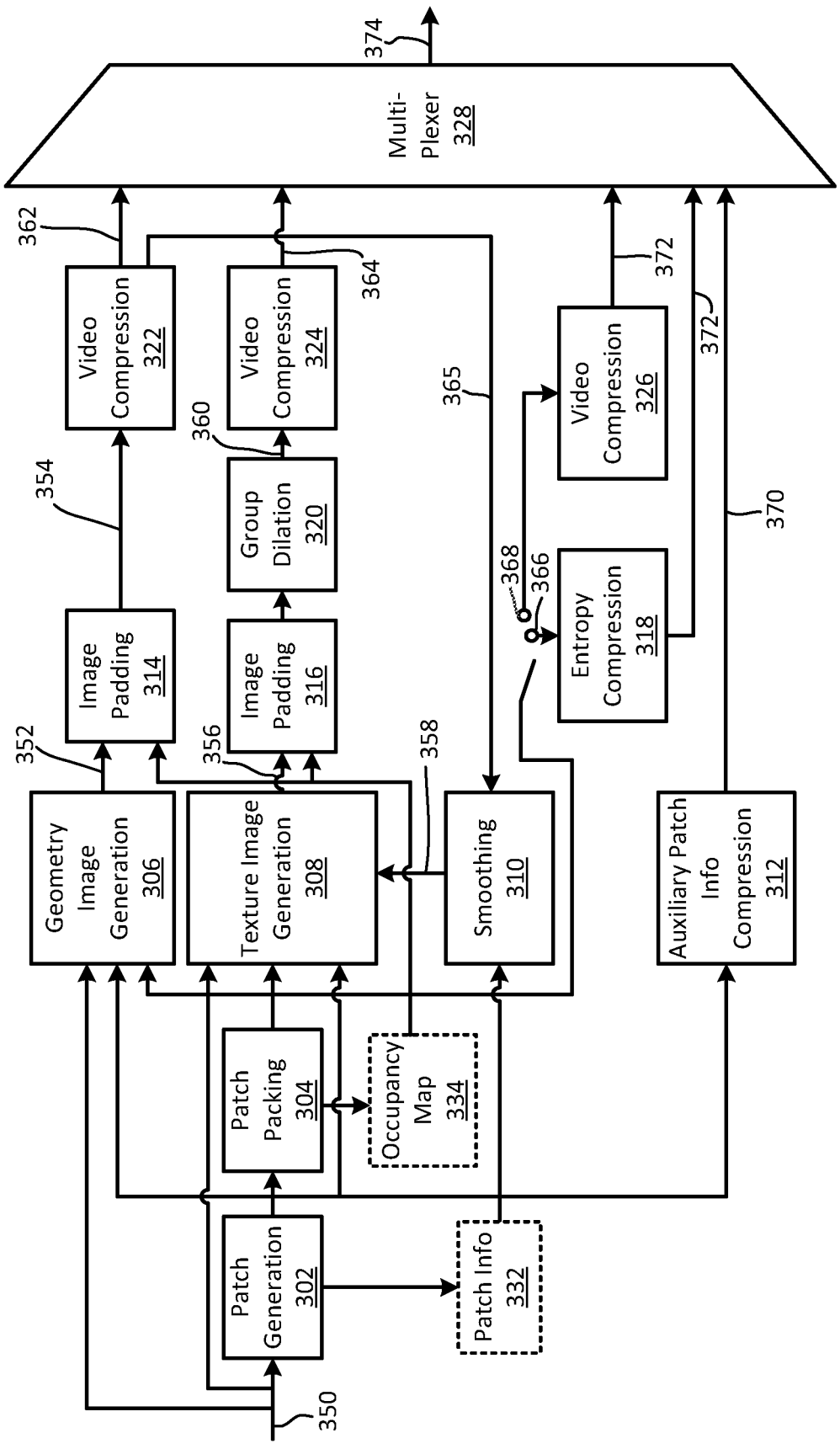
FIG. 3 is a schematic illustration of a simplified block diagram of a video encoder in accordance with an embodiment.
Figure 4:
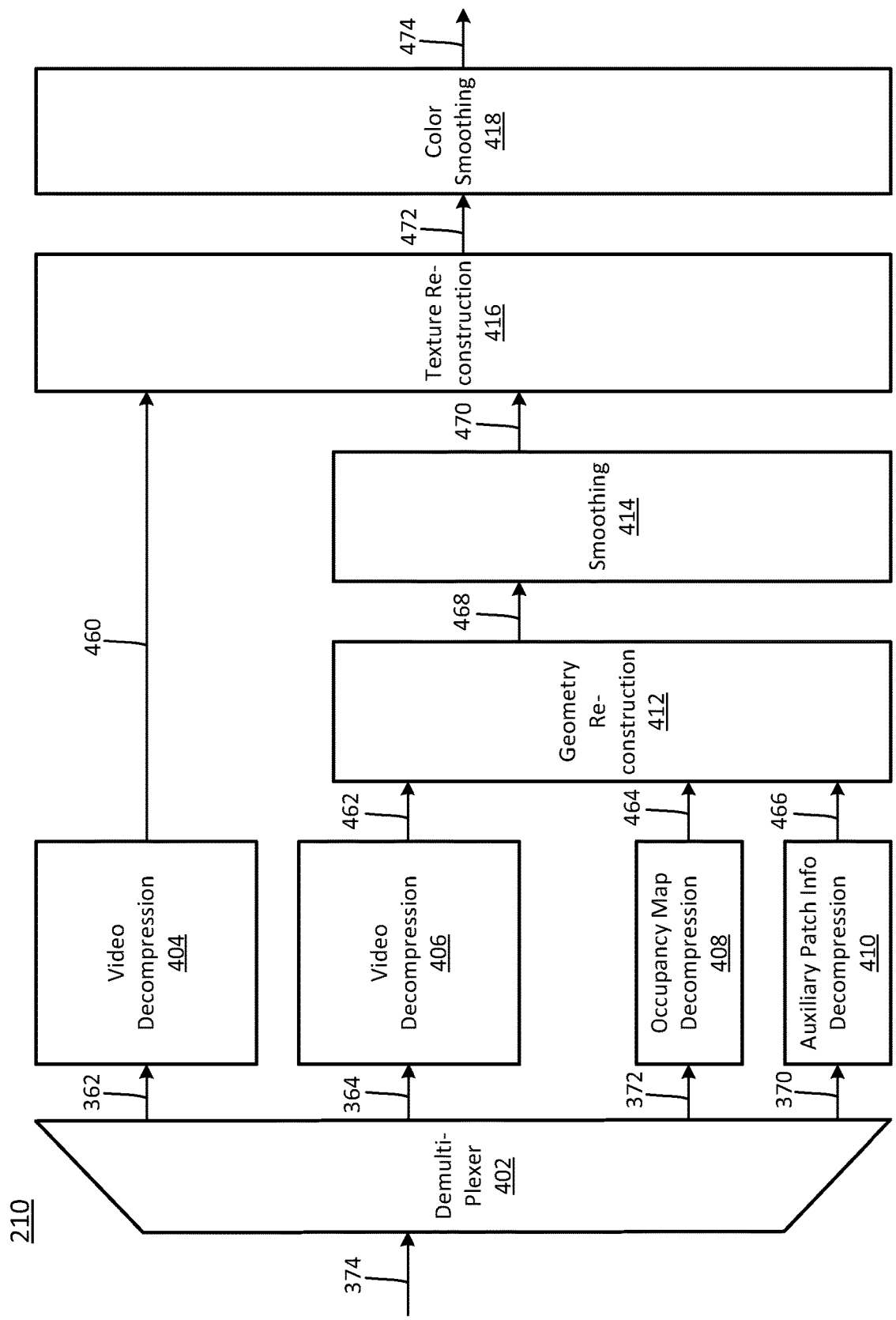
FIG. 4 is a schematic illustration of a simplified block diagram of a video decoder in accordance with an embodiment.

With reference to FIGS. 3-4, some aspects of V-PCC that may be performed by embodiments of the present disclosure are described below.

FIG. 3 illustrates an example functional block diagram of a video encoder 203 according to an embodiment of the present disclosure. In embodiments, the video encoder 203 may be a video-based point cloud encoder.

As illustrated in FIG. 3, the video encoder 203 may receive a point cloud frame(s) 350, and generate a geometry image 352, a texture image 356, and an occupancy map 334 based on the point cloud frame 350. The video encoder 203 may compress the geometry image 352 into a compressed geometry image 362, the texture image 356 into a compressed texture image 364, and the occupancy map 334 into a compressed occupancy map 372. A multiplexer 328 of the video encoder 203 may form a compressed bitstream 374 that includes the compressed geometry image 362, the compressed texture image 364, and the compressed occupancy map 372.

More specifically, in embodiments, the video encoder 203 may include a patch generation module 302 that segments the point cloud frame 350 into patches. Patches are useful entities of V-PCC. The patch generation process includes decomposing the point cloud frame 350 into a minimum number of patches with smooth boundaries, while also minimizing the reconstruction error. Encoders of the present disclosure may implement various methods to generate such a decomposition.

The video encoder 203 may include a patch packing module 304 that performs a packing process. The packing process includes mapping the extracted patches onto a 2D grid while minimizing the unused space and guaranteeing that every M×M (e.g., 16×16) block of the grid is associated with a unique patch. Efficient patch packing directly impacts the compression efficiency either by minimizing the unused space or ensuring temporal consistency. The patch packing module 304 may generate the occupancy map 334.

The video encoder 203 may include a geometry image generation module 306 and a texture image generation module 308. In order to better handle the case of multiple points being projected to the same sample, each patch may be projected onto two images, referred to as layers. For example, the geometry image generation module 306 and the texture image generation module 308 may exploit the 3D to 2D mapping computed during the packing process of the patch packing module 304 to store the geometry and texture of the point cloud as images (a.k.a. layers). The generated images/layers may be stored as a video frame(s) and compressed using a video codec (e.g. HM video codec) according to configurations provided as parameters.

In embodiments, the geometry image generation module 306 generates the geometry image 352 and the texture image generation module 308 generates the texture image 356, based on the input point cloud frame 350 and the occupancy map 334. In an embodiment, the geometry image 352 may be represented by a monochromatic frame of W×H in YUV420-8 bit format. In an embodiment, the occupancy map 334 image consists of a binary map that indicates for each cell of the grid whether it belongs to the empty space or to the point cloud. To generate the texture image 356, the texture image generation module 308 may exploit the reconstructed/smoothed geometry 358 in order to compute the colors to be associated with the re-sampled points.

The video encoder 203 may also include an image padding module 314 and an image padding module 316 for padding the geometry image 352 and the texture image 356, respectively, to form a padded geometry image 354 and a padded texture image 360. The image padding (a.k.a. background filling) simply fills unused space of the images with redundant information. A good background filling is a one that minimally increases the bit rate while does not introduce significant coding distortion around the patch boundaries. The image padding module 314 and the image padding module 316 may use the occupancy map 334 to form the padded geometry image 354 and the padded texture image 360, respectively. In an embodiment, the video encoder 203 may include a group dilation module 320 to form the padded texture image 360.

The video encoder 203 may include a video compression module 322 and a video compression module 324 for compressing the padded geometry image 354 and the padded texture image 360 into the compressed geometry image 362 and the compressed texture image 364, respectively.

The video encoder 203 may include an entropy compression module 318 for lossless encoding 366 of the occupancy map 334 and a video compression module 326 for lossy encoding 368 of the occupancy map 334.

In embodiments, the video encoder 203 may include a smoothing module 310 for generating smoothed geometry 358 by using a reconstructed geometry image 365, provided by the video compression module 322, and patch info 332. The smoothing procedure of the smoothing module 310 may aim at alleviating potential discontinuities that may arise at the patch boundaries due to compression artifacts. The smoothed geometry 358 may be used by the texture image generation module 308 to generate the texture image 356.

The video encoder 203 may also include an auxiliary patch information compression module 312 for forming compressed auxiliary patch information 370 that is provided in the compressed bitstream 374 by the multiplexer 328.

FIG. 4 illustrates an example functional block diagram of a video decoder 210 according to an embodiment of the present disclosure. In embodiments, the video decoder 210 may be a video-based point cloud decoder.

As illustrated in FIG. 4, the video decoder 210 may receive the coded bitstream 374 from the video encoder 203 to obtain the compressed texture image 362, the compressed geometry image 364, the compressed occupancy map 372, and the compressed auxiliary patch information 370. The video decoder 210 may decode the compressed texture image 362, the compressed geometry image 364, the compressed occupancy map 372, and the compressed auxiliary patch information 370 to obtain a decompressed texture image 460, a decompressed geometry image 462, a decompressed occupancy map 464, and decompressed auxiliary patch information 466, respectively. Following, the video decoder 210 may generate a reconstructed point cloud 474 based on the decompressed texture image 460, the decompressed geometry image 462, the decompressed occupancy map 464, and the decompressed auxiliary patch information 466.

In embodiments, the video decoder 210 may include a demultiplexer 402 that separates the compressed texture image 362, the compressed geometry image 364, the compressed occupancy map 372, and the compressed auxiliary patch information 370 of the compressed bitstream 374 received.

The video decoder 210 may include a video decompression module 404, a video decompression module 406, an occupancy map decompression module 408, and an auxiliary patch information decompression module 410 that decode the compressed texture image 362, the compressed geometry image 364, the compressed occupancy map 372, and the compressed auxiliary patch information 370, respectively.

The video decoder 210 may include a geometry reconstruction module 412 that obtains reconstructed (three dimensional) geometry 468 based on the decompressed geometry image 462, the decompressed occupancy map 464, and the decompressed auxiliary patch information 466.

The video decoder 210 may include a smoothing module 414 that smooths the reconstructed geometry 468 to obtain smoothed geometry 470. The smoothing procedure may aim at alleviating potential discontinuities that may arise at the patch boundaries due to compression artifacts.

The video decoder 210 may include a texture reconstruction module 416 for obtaining reconstructed texture 472 based on the decompressed texture image 460 and the smoothed geometry 470.

The video decoder 210 may include a color smoothing module 418 that smooths the color of the reconstructed texture 472 to obtain a reconstructed point cloud 474. Non-neighboring patches in 3D space are often packed next to each other in 2D videos. This implies that pixel values from non-neighboring patches might be mixed up by the block-based video codec. The color smoothing of the color smoothing module 418 may aim to reduce the visible artifacts that appear at patch boundaries.

Patch Generation in Video-based Point Cloud Compression (V-PCC)

In the MPEG PCC test model category 2 (TMC2) model, which may correspond to V-PCC, the patch generation may involve multiple steps. An example patch generation process 500 is illustrated in FIGS. 5 and 6A-6B.

Figure 5:
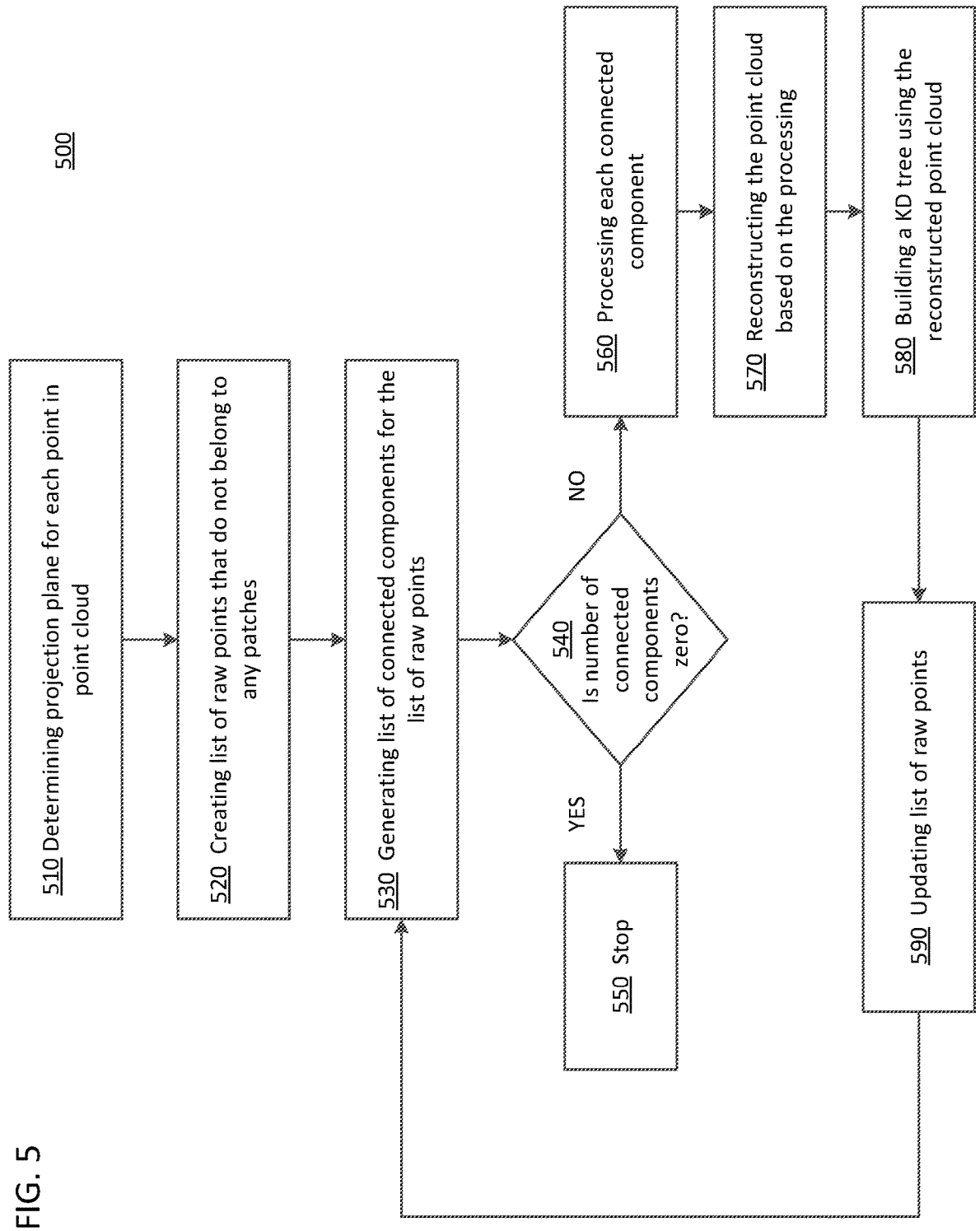
FIG. 5 illustrates an example of a patch generation process, in accordance with an embodiment.
Figure 6A:
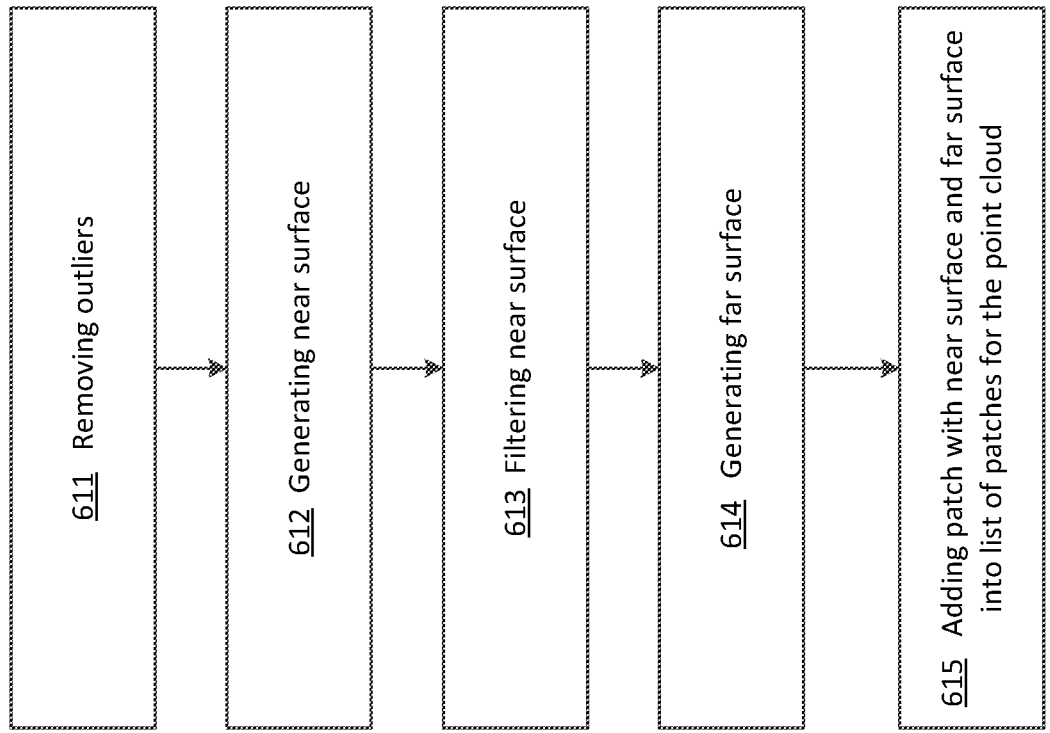
FIGS. 6A-B illustrate an examples of connected component processing, in accordance with an embodiment.
Figure 6B:
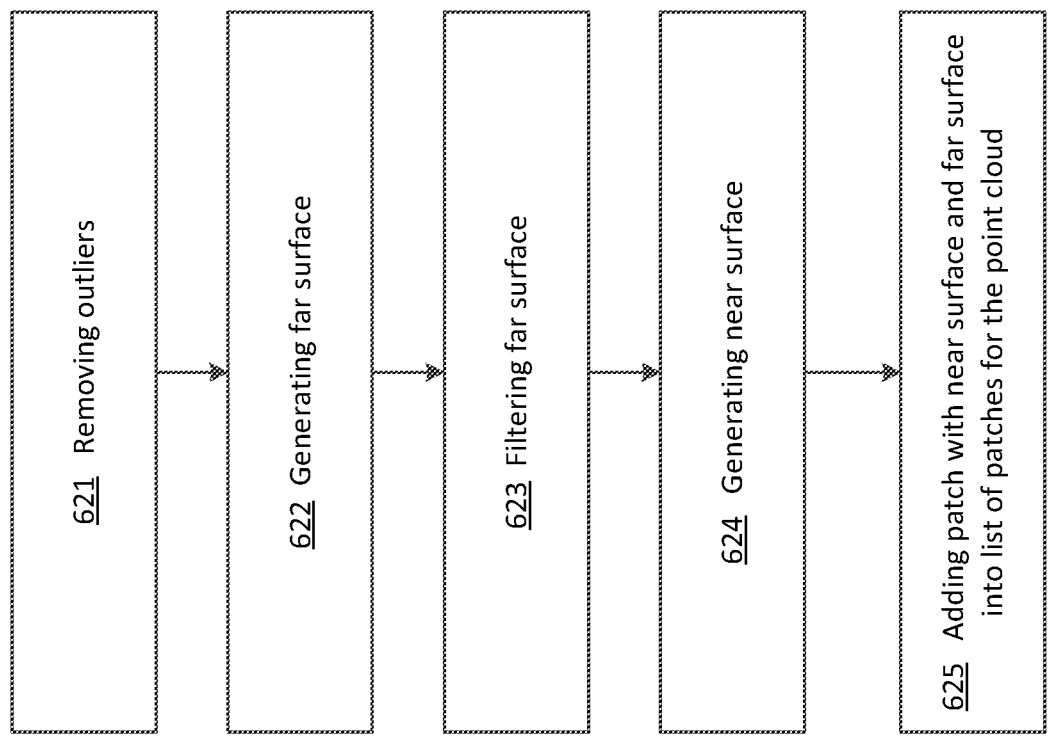

As illustrated in FIG. 5, operation 510 may include determining a projection plane for each point in a point cloud at operation 510 based on a defined clustering criterion, for example based on associated normal vectors and neighboring points.

Operation 520 may include creating a list of raw points that do not belong to any patches. Initially no patch is generated and no point belongs to any patches.

Operation 530 may include, for the list of raw points, generating a list of connected components by grouping points that have the same projection plane and also are neighboring to each other. If the number of points in a connected component is less than a given threshold, the connected component may be removed from the list. For example, in embodiments, each connected component may include a group of points that have a same projection plane and are neighboring to each other. For example, points may be neighboring to each other if they are within a certain threshold distance, or if there are no other points between the points, or if they satisfy some other neighboring condition.

Operation 540 may include determining whether the number of connected components in the list is zero. If the number of connected components in the list is zero, the patch generation process may stop at operation 550.

Operation 560 may include processing each connected component (CC) in the list. FIGS. 6A and 6B illustrate examples of the processing that may be performed in operation 560.

For example, as shown in FIG. 6A, operation 560', which may be an example of operation 560, may include operations 611-615. For convenience of description, operation 560' will be described here, and operation 560'' will be described separately below.

As shown in FIG. 6A, operation 611 may include removing outliers. for example, the points in the CC may be projected to the associated projection plane. The projected coordinate of a 3D point in the 2D UV plane may be $(\hat{u}_i, \hat{v}_i), i=0, \ldots, N-1$, where N is the number of points in the CC. Denote:

$$u_{min} = \min(u_0, u_1, \ldots, u_{N-1}) \qquad \text{Equation (1)}$$

$$v_{min} = \min(v_0, v_1, \ldots, v_{N-1}) \qquad \text{Equation (2)}$$

where $(u_i - u_{min}) > U_{threshold}$ or $(v_i - v_{min}) > V_{threshold}$, where $U_{threshold}$ and $V_{threshold}$ may be user-defined thresholds. The i-th point may be called an outlier point and may be removed from the CC. The resulted connected component may be called an updated connected component, denoted as CC'.

Operation 612 may include generating a near surface. If CC' after operation 611 is not empty, the projected coordinate of a 3D point in the 2D UV plane may be denoted as $(\hat{u}_i, \hat{v}_i), i=0, \ldots, \hat{N}-1$, where $\hat{N}$ is the number of points in CC'. The near surface, $S_{near}$ which is close to the projected plane, may be determined by selecting points satisfying the following condition: if one or more points have the same projected coordinate, select the point that has the smallest depth value to be part of the near surface $S_{near}$. Denote $(\tilde{u}_i, \tilde{v}_i), i=0, \ldots, \tilde{N}-1$ as the projected UV coordinate, $\tilde{d}_i, i=0, \ldots, \tilde{N}-1$ as the depth value, $\tilde{p}_i, i=0, \ldots, \tilde{N}-1$ as the index of the 3D point in the point cloud, where N is the number of points in the near surface $S_{near}$.

Operation 613 may include filtering the near surface. For a T×T grid in the projected plane where T may be user-defined positive integer, the minimum depth value of all those points in CC' that are projected to the T×T grid may be denoted as $\hat{d}_{min}$. A user-defined threshold may be denoted as $d_{threshold}$, a user-defined surface thickness may be denoted as $d_{surface}$, the minimum depth value of all the points in CC' may be denoted as $\hat{d}_{min}$, and the maximum allowed depth representation may be denoted as $D_{max}$. If a point $(\tilde{u}, \tilde{v}, \tilde{d})$ in $S_{near}$ that is projected to the T×T grid and satisfies the following condition:

$$\tilde{d} > \hat{d}_{min} + d_{threshold} \text{ or} \qquad \text{Equation (3)}$$

$$(\tilde{d} + d_{surface}) > (\hat{d}_{min} + D_{max}), \qquad \text{Equation (4)}$$

where $(\tilde{u}, \tilde{v})$ is the projected coordinate and $\tilde{d}$ is the depth value of the point, the point may be removed from the near surface $S_{near}$.

Operation 614 may include generating a far surface. The far surface $S_{far}$ may be initialized as the same as the near surface. If multiple points in CC' are projected to the same UV coordinate $(\tilde{u}_i, \tilde{v}_i)$, the i-th point in $S_{far}$ may be replaced with the point having the largest depth value such that the distance between this point and the point $\tilde{p}_i$ in $S_{near}$ is not greater than $d_{surface}$ and their color values are close to each other.

Operation 615 may include adding the patch with the near surface and far surface into the list of patches for the point cloud.

Returning again to FIG. 5, after operation 560 is performed, operation 570 may include re-constructing the point cloud based on the points in $S_{near}$ and $S_{far}$ for all patches.

Operation 580 may include building a K-dimensional (KD) tree using the reconstructed point cloud.

Operation 590 may include, for each point in the original point cloud, searching the nearest neighbour in the reconstructed point using the KD tree. If the distance between a point and its nearest neighbour in reconstructed point cloud is greater than a user-defined threshold, the point may be classified as a raw point.

After operation 590 is performed, process 500 may return to operation 530.

In embodiments, process 500 may include more or fewer operations, and the operations may be combined or rearranged in any order.

Another example operation 560 is illustrated in FIG. 6B. For example, as shown in FIG. 6B, operation 560'', which may be an example of operation 560, may include operations 621-625. For example, operation 621 may include removing outliers, operation 622 may include generating a far surface, operation 623 may include filtering the far surface, operation may include generating a near surface, and operation 625 may include adding the patch with the near surface and far surface into the list of patches for the point cloud.

In embodiments, operation 622 may include determining the far surface, $S_{far}$ which is further away from the project plane by selecting points satisfying the following condition: if one or more points have the same projected coordinate, select the point that has the largest depth value to be part of the far surface $S_{far}$ In embodiments, operation 622 may include, for a T×T grid in the projected plane where T is user-defined positive integer, the maximum depth value of all those points that projected to the T×T grid may be denoted as $\tilde{d}_{max}$. Denote a user-defined threshold as $d_{threshold}$, a user-defined surface thickness as $d_{surface}$, the maximum depth value of all the points in CC' as $\tilde{d}_{max}$, and the maximum allowed depth representation as $D_{max}$. If a point $(\tilde{u},\tilde{v},\tilde{d})$ in $S_{far}$ that is projected to the T×T grid and satisfies the following condition:

$$\tilde{d} < \tilde{d}_{max} - d_{threshold} \text{ or} \qquad \text{Equation (5)}$$

$$(-\tilde{d} + d_{surface}) > (\tilde{d}_{max} + D_{max}), \qquad \text{Equation (6)}$$

where $(\tilde{u},\tilde{v})$ is the projected coordinate and d is the depth value of the point, the point is removed from the far surface $S_{far}$.

In embodiments, operation 622 may include initializing the near surface $S_{near}$ as the same as the far surface. If multiple points in CC' are projected to the same UV coordinate $(\tilde{u}_i,\tilde{v}_i)$, replace the i-th point in $S_{near}$ with the point having the smallest depth value such that the distance between this point and the point $\tilde{p}_i$ in $S_{far}$ is not greater than $d_{surface}$ and their color values are close to each other.

As can be seen above, the patch generation process such as process 500 may have a high computation complexity. Specifically operations 580 and 590 may be complicated due to KD tree construction and nearest point search in the KD tree especially for a large point cloud with millions of points. Therefore, it may be desirable to remove the usage of KD tree in the patch generation algorithm.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

As shown in FIG. 5, a KD tree search may be used to determine the set of raw points that are not part of the list of generated patches or not close to the points in the generated patches. The set of raw points may be used for a new round of connected component generation and patch generation from the set of connected components.

Embodiments discussed below may relate to a patch generation method without the usage of a KD tree. For example, embodiments discussed below may correspond to modifications of process 500 or any of the steps illustrated in FIGS. 5 and 6A-6B and described above.

For example, after generation of the connected components, all raw points may be used. Thus the set of raw points, $\Theta_{raw}$ may be empty. The set of raw points may be generated by tracking the steps of patch generation and putting back those points that are removed from the process toward the generation of near and far surfaces.

In embodiments, after connected component generation in operation 530, if the number of points in a connected component is less than a given threshold, the connect component may be removed from the list. The points in the removed connected components may be put back into the raw point set $\Theta_{raw}$.

In embodiments, in operation 611, the identified outlier points may be removed from the connected points and may be put back into the raw point set $\Theta_{raw}$.

In embodiments, after operation 613, if a point $(\tilde{u},\tilde{v},\tilde{d})$ in $S_{near}$ that is projected to the T×T grid and satisfies the following condition:

$$-\tilde{d} > \tilde{d}_{min} + d_{threshold} \text{ or} \qquad \text{Equation (7)}$$

$$(\tilde{d} + d_{surface}) > (\tilde{d}_{min} + D_{max}), \qquad \text{Equation (8)}$$

where MO is the projected coordinate and a is the depth value of the point, the point may be removed from the near surface $S_{near}$. The removed point may be put back into the raw point set $\Theta_{raw}$. In another embodiment, all the points with the project coordinate as MO may be put back into the raw point set $\Theta_{raw}$.

In embodiments, after operation 623, if a point $(\tilde{u},\tilde{v},\tilde{d})$ in $S_{far}$ that is projected to the T×T grid and satisfies the following condition:

$$\tilde{d} < \tilde{d}_{max} - d_{threshold} \text{ or} \qquad \text{Equation (9)}$$

$$(-\tilde{d} + d_{surface}) > (-\tilde{d}_{max} + D_{max}), \qquad \text{Equation (10)}$$

where MO is the projected coordinate and a is the depth value of the point, the point may be removed from the far surface $S_{far}$. The removed point may be put back into the raw point set $\Theta_{raw}$. In another embodiment, all the points with the project coordinate as $(\tilde{u},\tilde{v})$ may be put back into the raw point set $\Theta_{raw}$.

In embodiments, after operation 615 or operation 625, for all the points $(\tilde{u}_i,\tilde{v}_i,\tilde{d}_i)$ in the far surface, where $(\tilde{u}_i,\tilde{v}_i)$ is the projected coordinate and $\tilde{d}_i$ is the depth value, points $(\tilde{u},\tilde{v},\tilde{d})$ in the connected component CC' may be identified that satisfy the conditions: $\tilde{u}=\tilde{u}_i, \tilde{v}=\tilde{v}_i$ and $\tilde{d}-\tilde{d}_i>\tilde{d}_{threshold}$ where $\tilde{d}_{threshold}$ is a user-defined threshold (for example, $\tilde{d}_{threshold}=4$). The points that satisfy the above conditions may be put back into the raw point set $\Theta_{raw}$.

In embodiments, after operation 615 or operation 625, for all the points $(\tilde{u}_i,\tilde{v}_i,\tilde{d}_i)$ in the near surface, where $(\tilde{u}_i,\tilde{v}_i)$ is the projected coordinate and $\tilde{d}_i$ is the depth value, points $(\tilde{u},\tilde{v},\tilde{d})$ in the connected component CC' may be identified that satisfy the conditions: $\tilde{u}=\tilde{u}_i, \tilde{v}=\tilde{v}_i$ and $\tilde{d}-\tilde{d}_i<-\tilde{d}_{threshold}$ where $\tilde{d}_{threshold}$ is a user-defined threshold (for example, $\tilde{d}_{threshold}=4$). The identified points may be put back into the raw point set $\Theta_{raw}$.

In embodiments, after operation 615 or operation 625, for all the points $(\tilde{u}_i,\tilde{v}_i,\tilde{d}_i)$ in the near surface, where $(\tilde{u}_i,\tilde{v}_i)$ is the projected coordinate and $\tilde{d}_i$ is the depth value and for all the points $(\tilde{u}_t,\tilde{v}_t,\tilde{d}_t)$ in the far surface, where $(\tilde{u}_i,\tilde{v}_i)$ is the projected coordinate and $\tilde{d}_i$ is the depth value, points $(\tilde{u},\tilde{v},\tilde{d})$ in the connected component CC' may be identified that satisfy the conditions: $\tilde{u}=\tilde{u}_i, \tilde{v}=\tilde{v}_i$ and $\tilde{d}-\tilde{d}_i>\tilde{d}_{threshold\_1}$ and $\tilde{d}_i-\tilde{d}>\tilde{d}_{threshold\_2}$ where $\tilde{d}_{threshold\_1}$ and $\tilde{d}_{threshold\_2}$ are two user-defined thresholds (for example, $\tilde{d}_{threshold\_1}=\tilde{d}_{threshold\_2}=2$). The points that satisfy the above conditions may be put back into the raw point set $\Theta_{raw}$.

Note that the above embodiments can be combined in variety of ways. After operation 560, the raw point set $\Theta_{raw}$ may already be identified. Thus operation 570, 580, and 590 may be omitted, and process 500 may return to operation 530 after operation 560 is completed.

When implementing the above fast patch generation method, a flag array $F=\{f_i, i=0, \ldots, N_p-1\}$ where $N_p$ is the number of points in the point cloud, can be used to identify the raw points. Initially operation 520, the flag array F may be initialized to 1, i.e., $f_i=1, i=0, \ldots, N_p-1$, indicating all the points are raw points before operation 530. A point in the point cloud can be identified using its index $p_i=i$, $i=0, \ldots, N_p-1$.

In operation 530, for all points in a connected component (CC), the corresponding flags may be set as 0. For example, if a point with index p is in the CC, we have $f_p=0$. In the above embodiments, when a point with index p is put back into the raw point set $\Theta_{raw}$, we set $f_p=1$. After operation 560, the set of points with $\{p_i: f_{pi}=1, i=0, \ldots, N_r\}$ is the raw point set, where $N_r$ is the number of points in the raw point set, $p_1$ is the index of the i-th point in the raw point set. Note that flag value 1 may be used to indicate a point as a raw point and 0 otherwise. Other values can be used to indicate raw point or non-raw point in the flag array F.

In operation 540, if the number of connected components in the list is zero, the patch generation process stops. In embodiments, if the number of points in $\theta_{raw}$ after operation 560 is less than a threshold, or less than or equal to a threshold, the patch generation process may stop.

Figure 7:
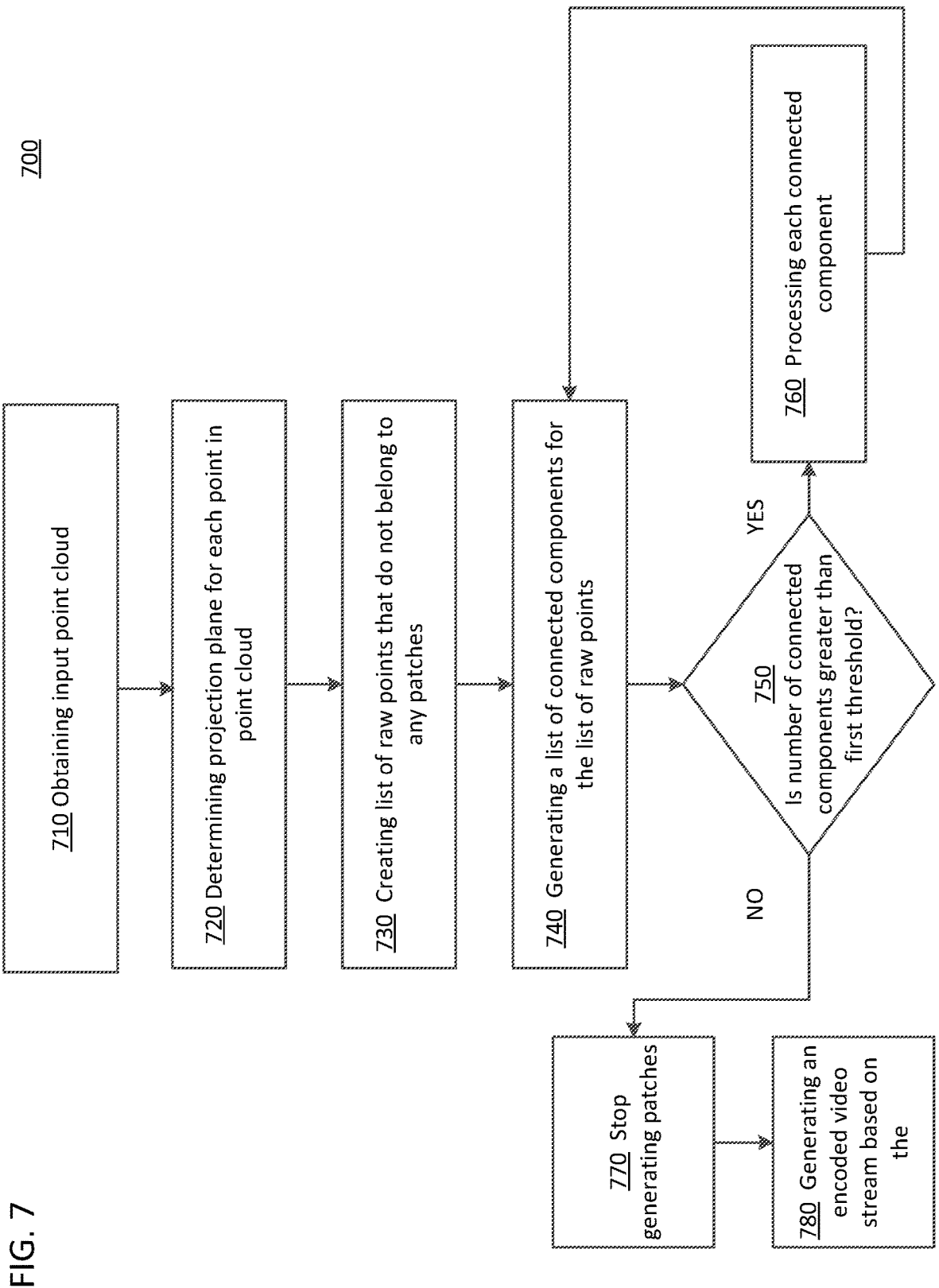
FIG. 7 is a flow diagram illustrating a process performed by an embodiment.

FIG. 7 is a flowchart of a method 700 of encoding a video stream using video point cloud coding. In some implementations, one or more process blocks of FIG. 7 may be performed by encoder 203. In some implementations, one or more process blocks of FIG. 7 may be performed by another device or a group of devices separate from or including the encoder 203, such as the decoder 210.

As shown in FIG. 7, in operation 710, the method 700 may include obtaining a point cloud.

In operation 720, the method 700 may include determining a projection plane for each point in the point cloud.

In operation 730, the method 700 may include creating a list of raw points included in the point cloud.

In operation 740, the method 700 may include generating a list of connected components for the list of raw points.

In operation 750, the method 700 may include determining whether a number of connected components in the list of connected components is greater than a first threshold. In embodiments, the first threshold may be zero.

In operation 760, the method 700 may include processing the connected components in the list of connected components and generating one or more patches based on the processed connected components.

Based on determining that the number of the connected components in the list of connected components is greater than the first threshold (YES at 750), method 700 may proceed to operation 760, which may include processing the connected components in the list of connected components and generating one or more patches based on the processed connected components. In embodiments, operation 760 may correspond to any one of operations 560, 560', and 560" discussed above. For example, operation 760 may include any of operations 611-615 and/or operations 621-625, as desired.

Based on determining that the number of the new connected components in the list of new connected components is less than or equal to the first threshold (NO at 750), method 700 may proceed to operation 770, at which patch generation may stop, and then proceed to operation 780, which may include generating an encoded video stream based on the selected color value.

In embodiments, the list of raw points may be updated based on at least one from among a result of the generating of the list of connected components, and a result of the processing of the connected components.

In embodiments, after operation 760, method 700 may return to operation 740. For example, at operation 740 the method may include generating a list of new connected components based on the updated list of raw points, and at operation 750 the method may include determining whether a number of new connected components in the list of new connected components is less than or equal to the first threshold. Based on determining that the number of the new connected components in the list of new connected components is greater than the first threshold (YES at 750), method 700 may include processing the new connected components in the list of new connected components and generating one or more new patches based on the processed new connected components at operation 760. Based on determining that the number of the new connected components in the list of new connected components is less than or equal to the first threshold (NO at 750) method 700 may include stopping the patch generation, and generating the encoded video stream based on the generated one or more patches and the generated one or more new patches. In embodiments, the updated list of raw points may be updated based on at least one from among a result of operation 740, and a result of operation 760.

In embodiments, after the list of connected components is generated, based on a number of points in a connected component being less than or equal to a second threshold, the connected component may be removed from the list of connected components, and the points in the connected component may be added to the updated list of raw points.

In embodiments, the processing of the connected components may include identifying outlier points in the connected components, and the outlier points may be removed from the connected components and added to the updated list of raw points.

In embodiments, the processing of the connected components may include, for a connected component in the list of connected components: identifying and removing outlier points from the connected component; generating a near surface corresponding to the connected component; filtering the near surface; generating a far surface corresponding to the connected component; and generating a patch based on the near surface and the far surface.

In embodiments, the filtering of the near surface may include removing a point based on determining that the point satisfies a following condition: $-\tilde{d} > \tilde{d}_{min} + d_{threshold}$ or $(\tilde{d} + d_{surface}) > (\tilde{d}_{min} + D_{max})$ where $\tilde{d}$ represents a depth value of the point, $d_{min}$ represents a minimum depth value of points in the connected component, $d_{threshold}$ represents a second threshold, $d_{surface}$ represents a surface thickness, and $D_{max}$ represents a maximum allowed depth representation. The removed point may be added to the updated list of raw points.

In embodiments, the generating of the patch may include removing a point from the patch based on determining that the point satisfies a following condition: $\tilde{u} = \tilde{u}_i, \tilde{v} = \tilde{v}_i$ and $\tilde{d} - \tilde{d}_i > \tilde{d}_{threshold}$, where $(\tilde{u}, \tilde{v})$ represents coordinates of the point, $\tilde{d}$ represents a depth value of the point, $(\tilde{u}_i, \tilde{v}_i)$ represents coordinates of a projected point corresponding to the far surface, $\tilde{d}_i$ represents a depth value of the projected point, and $d_{threshold}$ represents a second threshold. The removed point may be added to the updated list of raw points.

In embodiments, the generating of the patch may include removing a point from the patch based on determining that the point satisfies a following condition: $\tilde{u} = \tilde{u}_i, \tilde{v} = \tilde{v}_i$ and $\tilde{d} - \tilde{d}_i < -\tilde{d}_{threshold}$, where $(\tilde{u}, \tilde{v})$ represents coordinates of the point, $\tilde{d}$ represents a depth value of the point, $(\tilde{u}_i, \tilde{v}_i)$ represents coordinates of a projected point corresponding to the near surface, $\tilde{d}_i$ represents a depth value of the projected point, and $d_{threshold}$ represents a second threshold. The removed point may be added to the updated list of raw points.

In embodiments, the processing of the connected components may include, for a connected component in the list of connected components: identifying and removing outlier points from the connected component; generating a far surface corresponding to the connected component; filtering the far surface; generating a near surface corresponding to the connected component; and generating a patch based on the near surface and the far surface.

In embodiments, the generating of the patch may include removing a point from the patch based on determining that the point satisfies a following condition: $\tilde{u}=\tilde{u}_i, \tilde{v}=\tilde{v}_i$ and $\tilde{d}-\tilde{d}_i > \tilde{d}_{threshold}$, where $(\tilde{u},\tilde{v})$ represents coordinates of the point, d represents a depth value of the point, $(\tilde{u}_i,\tilde{v}_i)$ represents coordinates of a projected point corresponding to the far surface, $\tilde{d}_i$ represents a depth value of the projected point, and $d_{threshold}$ represents a second threshold. The removed point may be added to the updated list of raw points.

In embodiments, the generating of the patch may include removing a point from the patch based on determining that the point satisfies a following condition: $\tilde{u}=\tilde{u}_i, \tilde{v}=\tilde{v}_i$ and $\tilde{d}-\tilde{d}_i < -\tilde{d}_{threshold}$, where $(\tilde{u},\tilde{v})$ represents coordinates of the point, d represents a depth value of the point, $(\tilde{u}_i,\tilde{v}_i)$ represents coordinates of a projected point corresponding to the near surface, $\tilde{d}_i$ represents a depth value of the projected point, and $d_{threshold}$ represents a second threshold. The removed point may be added to the updated list of raw points.

In embodiments, raw points included in the list of raw points may be identified using a flag array.

Although FIG. 7 shows example blocks of the method 700, in some implementations, the method 700 may include additional blocks, fewer blocks, different blocks, or differently arranged blocks than those depicted in FIG. 7 Additionally, or alternatively, two or more of the blocks of the method 700 may be performed in parallel.

Figure 8:
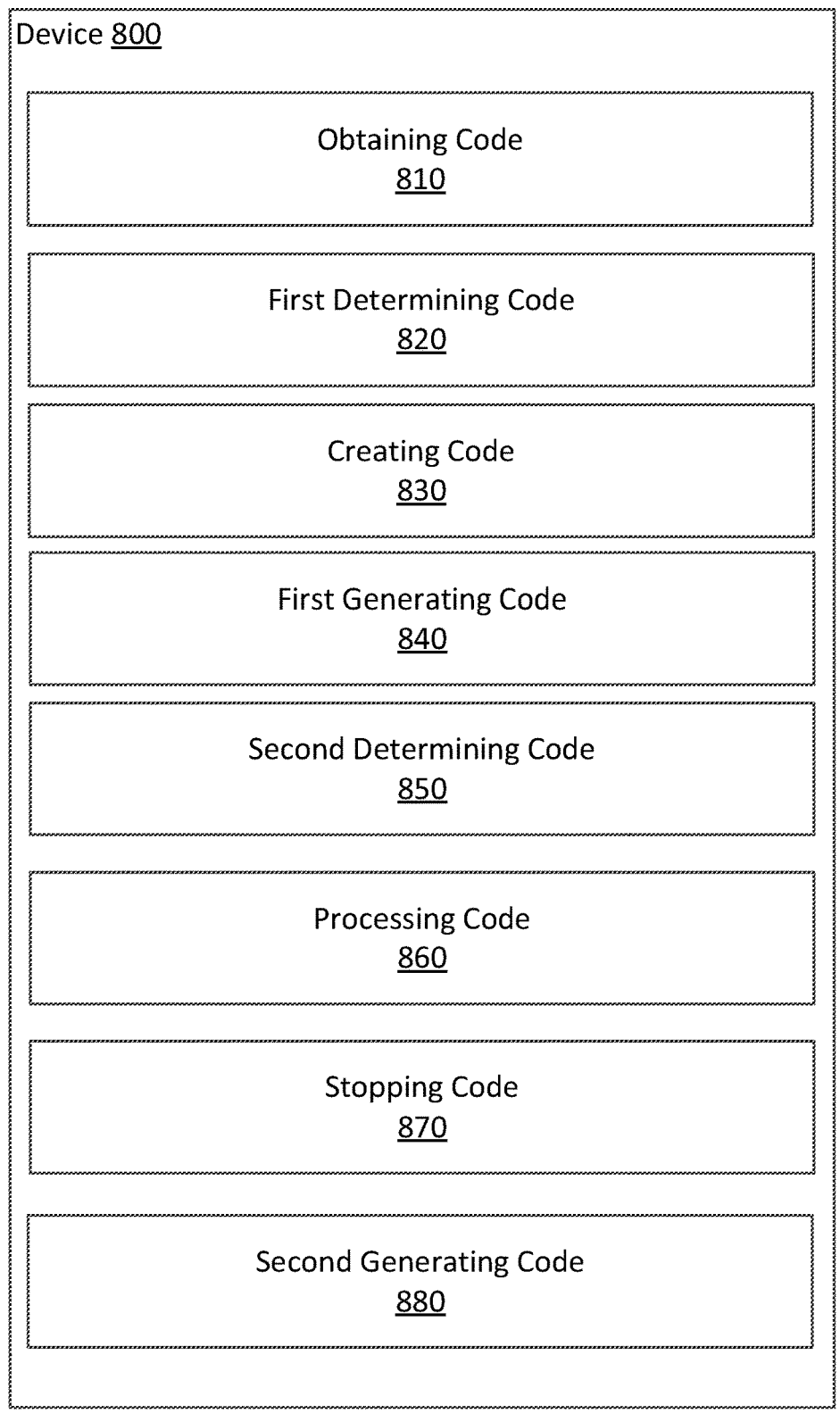
FIG. 8 is a diagram illustrating a device in accordance with an embodiment.

FIG. 8 is a diagram of an apparatus 800 for encoding a video stream using video point cloud coding, according to embodiments. As shown in FIG. 8, the apparatus 800 includes first obtaining code 810, first determining code 820, creating code 830, first generating code 840, second determining code 850, processing code 860, stopping code 870, and second generating code 880.

The first obtaining code 810 may be configured to cause the at least one processor to obtain a point cloud.

The first determining code 820 may be configured to cause the at least one processor to determine a projection plane for each point in the point cloud.

The creating code 830 may be configured to cause the at least one processor to create a list of raw points included in the point cloud.

The first generating code 840 may be configured to cause the at least one processor to generate a list of connected components for the list of raw points.

The second determining code 850 may be configured to cause the at least one processor to determine whether a number of connected components in the list of connected components is less than or equal to a first threshold.

The processing code 860 may be configured to cause the at least one processor to, based on determining that the number of the connected components in the list of connected components is greater than the first threshold, processing the connected components in the list of connected components and generating one or more patches based on the processed connected components. and The stopping code 870 may be configured to cause the at least one processor to stop a patch generation process.

The second generating code 880 may be configured to cause the at least one processor to generate an encoded video stream based on the generated one or more patches.

In embodiments, the list of raw points may be updated based on at least one from among a result of execution of the first generating code 840, and a result of the processing code 860.

The techniques, described above, can be implemented as computer software using computer-readable instructions and physically stored in one or more computer-readable media.

For example, FIG. 9 shows a computer system 900 suitable for implementing certain embodiments of the disclosure.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of encoding a video stream using video point cloud coding, the method being performed by at least one processor and comprising:
   obtaining a point cloud;
   determining a projection plane for each point in the point cloud;
   creating a list of raw points included in the point cloud;
   generating a list of connected components for the list of raw points;
   determining whether a number of connected components in the list of connected components is greater than a first threshold;
   based on determining that the number of the connected components in the list of connected components is greater than the first threshold, processing the connected components in the list of connected components and generating one or more patches based on the processed connected components; and
   generating an encoded video stream based on the generated one or more patches,
   wherein the list of raw points is updated based on at least one from among a result of the generating of the list of connected components, and a result of the processing of the connected components.

2. The method of claim 1, further comprising:
generating a list of new connected components based on the updated list of raw points;
determining whether a number of new connected components in the list of new connected components is greater than the first threshold;
based on determining that the number of the new connected components in the list of new connected components is greater than the first threshold, processing the new connected components in the list of new connected components and generating one or more new patches based on the processed new connected components; and
generating the encoded video stream based on the generated one or more patches and the generated one or more new patches,
wherein the updated list of raw points is updated based on at least one from among a result of the generating of the list of new connected components, and a result of the processing of the new connected components.

3. The method of claim 1, wherein after the list of connected components is generated, based on a number of points in a connected component being less than a second threshold, the connected component is removed from the list of connected components, and the points in the connected component are added to the updated list of raw points.

4. The method of claim 1, wherein the processing of the connected components comprises identifying outlier points in the connected components, and
wherein the outlier points are removed from the connected components and added to the updated list of raw points.

5. The method of claim 1, wherein the processing of the connected components comprises, for a connected component in the list of connected components:
identifying and removing outlier points from the connected component;
generating a near surface corresponding to the connected component;
filtering the near surface;
generating a far surface corresponding to the connected component;
generating a patch based on the near surface and the far surface.

6. The method of claim 5, wherein the filtering of the near surface comprises removing a point based on determining that the point satisfies a following condition:

$$\tilde{d} > \tilde{d}_{min} + d_{threshold} \text{ or}$$

$$(\tilde{d} + d_{surface}) > (\tilde{d}_{min} + D_{max}),$$

where $\tilde{d}$ represents a depth value of the point, $\tilde{d}_{min}$ represents a minimum depth value of points in the connected component, $d_{threshold}$ represents a second threshold, $d_{surface}$ represents a surface thickness, and $D_{max}$ represents a maximum allowed depth representation, and
wherein the removed point is added to the updated list of raw points.

7. The method of claim 5, wherein the generating of the patch comprises removing a point from the patch based on determining that the point satisfies a following condition:

$$\tilde{u} = \tilde{u}_i, \tilde{v} = \tilde{v}_i \text{ and}$$

$$\tilde{d} - \tilde{d}_i > \tilde{d}_{threshold}$$

where $(\tilde{u}, \tilde{v})$ represents coordinates of the point, $\tilde{d}$ represents a depth value of the point, $(\tilde{u}_i, \tilde{v}_i)$ represents coordinates of a projected point corresponding to the far surface, $\tilde{d}_i$ represents a depth value of the projected point, and $d_{threshold}$ represents a second threshold, and
wherein the removed point is added to the updated list of raw points.

8. The method of claim 5, wherein the generating of the patch comprises removing a point from the patch based on determining that the point satisfies a following condition:

$$\tilde{u} = \tilde{u}_i, \tilde{v} = \tilde{v}_i \text{ and}$$

$$\tilde{d} - \tilde{d}_i < -\tilde{d}_{threshold}$$

where $(\tilde{u}, \tilde{v})$ represents coordinates of the point, $\tilde{d}$ represents a depth value of the point, $(\tilde{u}_i, \tilde{v}_i)$ represents coordinates of a projected point corresponding to the near surface, $\tilde{d}_i$ represents a depth value of the projected point, and $d_{threshold}$ represents a second threshold, and
wherein the removed point is added to the updated list of raw points.

9. The method of claim 1, wherein the processing of the connected components comprises, for a connected component in the list of connected components:
identifying and removing outlier points from the connected component;
generating a far surface corresponding to the connected component;
filtering the far surface;
generating a near surface corresponding to the connected component; and
generating a patch based on the near surface and the far surface.

10. The method of claim 9, wherein the generating of the patch comprises removing a point from the patch based on determining that the point satisfies a following condition:

$$\tilde{u} = \tilde{u}_i, \tilde{v} = \tilde{v}_i \text{ and}$$

$$\tilde{d} - \tilde{d}_i > \tilde{d}_{threshold}$$

where $(\tilde{u}, \tilde{v})$ represents coordinates of the point, $\tilde{d}$ represents a depth value of the point, $(\tilde{u}_i, \tilde{v}_i)$ represents coordinates of a projected point corresponding to the far surface, $\tilde{d}_i$ represents a depth value of the projected point, and $d_{threshold}$ represents a second threshold, and
wherein the removed point is added to the updated list of raw points.

11. The method of claim 9, wherein the generating of the patch comprises removing a point from the patch based on determining that the point satisfies a following condition:

$$\tilde{u} = \tilde{u}_i, \tilde{v} = \tilde{v}_i \text{ and}$$

$$\tilde{d} - \tilde{d}_i < -\tilde{d}_{threshold}$$

where $(\tilde{u}, \tilde{v})$ represents coordinates of the point, $\tilde{d}$ represents a depth value of the point, $(\tilde{u}_i, \tilde{v}_i)$ represents coordinates of a projected point corresponding to the near surface, $\tilde{d}_i$ represents a depth value of the projected point, and $d_{threshold}$ represents a second threshold, and
wherein the removed point is added to the updated list of raw points.

12. The method of claim 1, wherein raw points included in the list of raw points are identified using a flag array.

13. An apparatus for encoding a video stream using video point cloud coding, the apparatus comprising:
at least one memory configured to store program code; and at least one processor configured to read the program code and operate as instructed by the program code, the program code comprising:
first obtaining code configured to cause the at least one processor to obtain a point cloud;
first determining code configured to cause the at least one processor to determine a projection plane for each point in the point cloud;
creating code configured to cause the at least one processor to create a list of raw points included in the point cloud;
first generating code configured to cause the at least one processor to generate a list of connected components for the list of raw points;
second determining code configured to cause the at least one processor to determine whether a number of connected components in the list of connected components is greater than a first threshold;
processing code configured to cause the at least one processor to, based on determining that the number of the connected components in the list of connected components is greater than the first threshold, processing the connected components in the list of connected components and generating one or more patches based on the processed connected components; and
second generating code configured to cause the at least one processor to generate an encoded video stream based on the generated one or more patches,
wherein the list of raw points is updated based on at least one from among a result of the generating of the list of connected components, and a result of the processing of the connected components.

14. The apparatus of claim 13, wherein the program code further includes:
generating a list of new connected components based on the updated list of raw points;
determining whether a number of new connected components in the list of new connected components is greater than the first threshold;
based on determining that the number of the new connected components in the list of new connected components is greater than the first threshold, processing the new connected components in the list of new connected components and generating one or more new patches based on the processed new connected components; and
generating the encoded video stream based on the generated one or more patches and the generated one or more new patches,
wherein the updated list of raw points is updated based on at least one from among a result of the generating of the list of new connected components, and a result of the processing of the new connected components.

15. The apparatus of claim 13, wherein after the list of connected components is generated, based on a number of points in a connected component being less than a second threshold, the connected component is removed from the list of connected components, and the points in the connected component are added to the updated list of raw points.

16. The apparatus of claim 13, wherein the processing of the connected components comprises identifying outlier points in the connected components, and
wherein the outlier points are removed from the connected components and added to the updated list of raw points.

17. The apparatus of claim 13, wherein the processing code further includes:
identifying and removing outlier points from a connected component in the list of connected components;
generating a near surface corresponding to the connected component;
filtering the near surface;
generating a far surface corresponding to the connected component;
generating a patch based on the near surface and the far surface.

18. The apparatus of claim 17, wherein the filtering of the near surface comprises removing a point based on determining that the point satisfies a following condition:

$$\tilde{d} > \tilde{d}_{min} + d_{threshold} \text{ or}$$

$$(\tilde{d} + d_{surface}) > (\tilde{d}_{min} + D_{max}),$$

where $\tilde{d}$ represents a depth value of the point, $\tilde{d}_{min}$ represents a minimum depth value of points in the connected component, $d_{threshold}$ represents a second threshold, $d_{surface}$ represents a surface thickness, and $D_{max}$ represents a maximum allowed depth representation, and
wherein the removed point is added to the updated list of raw points.

19. The apparatus of claim 13, wherein the processing code further comprises:
identifying and removing outlier points from a connected component in the list of connected components;
generating a far surface corresponding to the connected component;
filtering the far surface;
generating a near surface corresponding to the connected component; and
generating a patch based on the near surface and the far surface.

20. A non-transitory computer-readable medium storing computer instructions for encoding a video stream using video point cloud coding that, when executed by at least one processor, cause the at least one processor to:
obtain a point cloud;
determine a projection plane for each point in the point cloud;
create a list of raw points included in the point cloud;
generate a list of connected components for the list of raw points;
determine whether a number of connected components in the list of connected components is greater than a first threshold;
based on determining that the number of the connected components in the list of connected components is greater than the first threshold, process the connected components in the list of connected components and generate one or more patches based on the processed connected components; and
generate an encoded video stream based on the generated one or more patches,
wherein the list of raw points is updated based on at least one from among a result of the generating of the list of connected components, and a result of the processing of the connected components.

* * * * *